United States Patent [19]

Pommer et al.

[11] 3,892,861
[45] July 1, 1975

[54] SYNERGISTIC FUNGICIDE OF 2-(METHOXYCARBAMOYL)-BENZIMIDAZOLE AND AN N-SUBSTITUTED PHTHALIMIDE

[75] Inventors: Ernst-Heinrich Pommer, Limburgerhof; Guenter Scheuerer, Ludwigshafen; Gerhard Bolz, Frankenthal; Dietrich Mangold, Neckargemuend, all of Germany

[73] Assignee: Badische Anilin- & Soda-Fabrik Aktiengesellschaft, Ludwigshafen (Rhine), Germany

[22] Filed: May 29, 1973

[21] Appl. No.: 364,858

[30]        Foreign Application Priority Data
   June 2, 1972   Germany.............................. 2226945

[52] U.S. Cl................................. 424/273; 424/274
[51] Int. Cl................................................ A01n 9/22
[58] Field of Search............................ 424/273, 274

[56]            References Cited
             UNITED STATES PATENTS
2,553,770   5/1951   Kittleson............................. 424/134
3,178,447   4/1965   Kohn .................................. 424/274

FOREIGN PATENTS OR APPLICATIONS
1,190,614   5/1970   United Kingdom

*Primary Examiner*—Albert T. Meyers
*Assistant Examiner*—Allen J. Robinson
*Attorney, Agent, or Firm*—Johnston, Keil, Thompson & Shurtleff

[57]            ABSTRACT

A fungicidal composition which is a synergistic mixture of 2-(methoxycarbamoyl)-benzimidazole and an N-substituted phthalimide having a combined fungicidal action greater than the sum of actions of the individual components. The composition is especially useful in preventing fungus growth on seeds and plants.

5 Claims, No Drawings

SYNERGISTIC FUNGICIDE OF 2-(METHOXYCARBAMOYL)-BENZIMIDAZOLE AND AN N-SUBSTITUTED PHTHALIMIDE

The present invention relates to a fungicide containing a mixture of different active ingredients. It is known to use 2-(methoxycarbamoyl)-benzimidazole and N-substituted phthalimides as fungicides. However, their fungicidal action is poor.

We have now found that a fungicide containing a composition of a. 2-(methoxycarbamoyl)-benzimidazole and b. an N-substituted phthalimide selected from the group consisting of N-trichloromethylthiotetrahydrophthalimide (captan), N-trichloromethylthiophthalimide (folpet) and N-(1,1,2,2-tetrachloroethylthio)-tetrahydrophthalimide (captafol) has a fungicidal action superior to that of its individual components.

The fungicides according to the invention are particularly suitable for controlling plant diseases, e.g., *Venturia inaequalis* (apple scab) in apples, (*Podosphaera leucotricha* (powdery mildew) in apples, *Plasmopara viticola* (mildew) in grapes, *Uncinula necator* (common powdery mildew) in grapes, *Botrytis cinerea* (gray mold) in strawberries, lettuce, ornamentals and vines, and *Cercospora* in beet. They may also be used for treating seed to control seed- and soil-borne fungi and for protecting wood, surface coating compositions and the coatings prepared therefrom, leather and other materials against fungus attack.

The ratio of the active ingredients to each other may vary within wide limits; however, it is preferred to employ a ratio of $a:b$ of from 1:1 to 1:4, especially 1:3 to 1:4.

The fungicidal action of the fungicides of the invention is much greater than the sum of actions of their individual components.

If the compositions of the invention are used for treating seed, 150 to 1,000 g should be employed per kg of seed; if used for treating plants, application rates may vary from 0.5 to 5 kg per hectare. For controlling injurious soil-borne fungi rates of from 2 to 10 kg per hectare are recommended. As technical microbiocides the compositions of the invention may be used in amounts of from 0.05 to 3 percent, with reference to the weight of the material to be preserved; for protecting the surface of materials such as wood the compositions may also be combined with suitable solvents in amounts of from 0.25 to 5 percent, with reference to the weight of the solvent.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may be used as spray liquids. Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers.

EXAMPLE 1

The leaves of vines planted in pots were sprayed with aqueous dispersions of finely ground formulations consisting to the extent of 80 percent (by weight) of active ingredient or active ingredient composition and 20 percent of sodium lignin sulfonate. After the sprayed-on layer has dried the leaves were infected by spraying them with a suspension of peronospora (*Plasmopara viticola*) spores. The plants were initially placed for 12 hours in a steam-saturated chamber at 20°C and subsequently for 8 days in a greenhouse kept at a temperature between 20° and 30°C. To accelerate and intensify the outbreak of spores the pots were again placed for 12 hours in the steam-saturated chamber. The undersides of the leaves were then assessed for attack; untreated but infected control plants were used for comparison purposes.

The results are given below; the degree of effectiveness of the active ingredients and compositions thereof was calculated employing Abbot's formula:

$$\text{degree of effectiveness} = \frac{\text{attack in control} - \text{attack in experiment}}{\text{attack in control}} \times 100$$

| Active ingredient or composition thereof | Ratio in parts by wt. | Leaf attack in % after spraying with dispersions containing active ingredient in amounts of | | Degree of effectiveness in % | |
|---|---|---|---|---|---|
| | | 0.05 | 0.01 | 0.05 | 0.01 |
| 2-(methoxycarbamoyl)-benzimidazole | — | 73 | 75 | 3 | 0 |
| folpet | — | 44 | 75 | 41 | 0 |
| 2-(methoxycarbamoyl)-benzimidazole+ folpet | 1:1 | 33 | 46 | 56 | 22 |
| | 1:2 | 29 | 41 | 61 | 45 |
| | 1:3 | 26 | 35 | 65 | 53 |
| control (untreated) | | 75 | | | |

EXAMPLE 2

20 ml of a nutrient solution consisting of grape juice and water in the weight ratio 1:1 was placed in 100 ml Erlenmeyer flasks. The active ingredients and compositions thereof listed in the table below were then added. The contents of the flasks were inoculated with conidia of *Botrytis cinerea*. After an incubation period of 5 days at 22° to 23°C the extent of fungus spread on the surface of the nutrient solution was assessed.

0 = no fungus growth
1 = odd fungus colonies
2 = 5 to 10 percent of surface covered by fungus
3 = 10 to 30 percent of surface covered by fungus
4 = 30 to 60 percent of surface covered by fungus
5 = 60 to 100 percent of surface covered by fungus

| ctive ingredient | Ratio | Parts of active ingredient or active ingredient composition per million parts of nutrient solution | | |
|---|---|---|---|---|
| | | 1 | 0.1 | 0.05 |
| (methoxycarbamoyl)-<br>:nzimidazole | — | 2 | 3 | 4 |
| iptan | — | 4 | 5 | 5 |
| lpet | — | 4 | 5 | 5 |
| iptafol | — | 3 | 4 | 5 |
| (methoxycarbamoyl)-<br>:nzimidazole +<br>iptan | 1:1 | 0 | 2 | 4 |
| | 1:2 | 0 | 0 | 2 |
| | 1:3 | 0 | 1 | 2 |
| | 1:4 | 0 | 1 | 2 |
| (methoxycarbamoyl)-<br>:nzimidazole + folpet | 1:1 | 0 | 2 | 4 |
| | 1:2 | 0 | 1 | 3 |
| | 1:3 | 0 | 0 | 2 |
| | 1:4 | 0 | 1 | 1 |
| (methoxycarbamoyl)-<br>:nzimidazole + captafol | 1:1 | 0 | 0 | 3 |
| | 1:2 | 0 | 0 | 2 |
| | 1:3 | 0 | 0 | 2 |
| | 1:4 | 0 | 0 | 1 |
| introl (untreated) | — | 5 | | |

EXAMPLE 3

In the open, 4 year old apple trees of the "Golden elicious" variety were sprayed during the period ex- nding from the beginning of April to the end of Au- ist and at two -week intervals a total of 11 times with ıray liquors containing 0.12 percent of active ingredi- ıt or active ingredient composition in the ratio 1:3. At e beginning of September the extent to which the aves had been attacked by the apple scab Venturia aequalis was assessed.

| Active ingredient | Ratio | Concentration | Leaf attack |
|---|---|---|---|
| 2-(methoxycarbamoyl)-<br>benzimidazole | — | 0.12% | 2.3 |
| captan | — | 0.12% | 3.0 |
| 2-(methoxycarbamoyl)-<br>benzimidazole + captan | 1:3 | 0.12% | 1.8 |
| control (untreated) | — | — | 5.5 |

1 = no attack, graduated down to
9 = surface of leaves completely covered with scab

What we claim is:
1. A fungicidal composition comprising a mixture of
  a. 2-(methoxycarbamoyl)-benzimidazole and
  b. an N-substituted phthalimide selected from the group consisting of N-trichloromethylthiotetrahydrophthalimide, N-trichloromethylthiophthalimide and N-(1,1,2,2-tetrachloroethylthio)-tetrahydrophthalimide in a weight ratio of a:b of 1:1 to 1:4.
2. The fungicidal composition of claim 1 wherein component b) is N-trichloromethylthiotetrahydrophthalimide.
3. The fungicidal composition of claim 1 wherein the weight ratio of a:b is 1:3 to 1:4.
4. The fungicidal composition of claim 1 wherein component b) is N-trichloromethylthiophthalimide.
5. The fungicidal composition of claim 1 wherein component b) is N-(1,1,2,2-tetrachloroethylthio)-tetrahydrophthalimide.

* * * * *

UNITED STATES PATENT AND TRADEMARK OFFICE
CERTIFICATE OF CORRECTION

PATENT NO. : 3,892,861
DATED : July 1, 1975
INVENTOR(S) : POMMER et al

It is certified that error appears in the above–identified patent and that said Letters Patent are hereby corrected as shown below:

Column 1, Line 65, the sentence beginning with "Aqueous formulations may be ..." should begin a new paragraph.

Signed and Sealed this

Fourteenth Day of September 1976

[SEAL]

Attest:

RUTH C. MASON
*Attesting Officer*

C. MARSHALL DANN
*Commissioner of Patents and Trademarks*